F. B. GIESLER.
Assignor of one-half to A. LOGEMANN.
SMOKE CONSUMING FURNACE.
No. 10,639. Reissued Aug. 25, 1885.
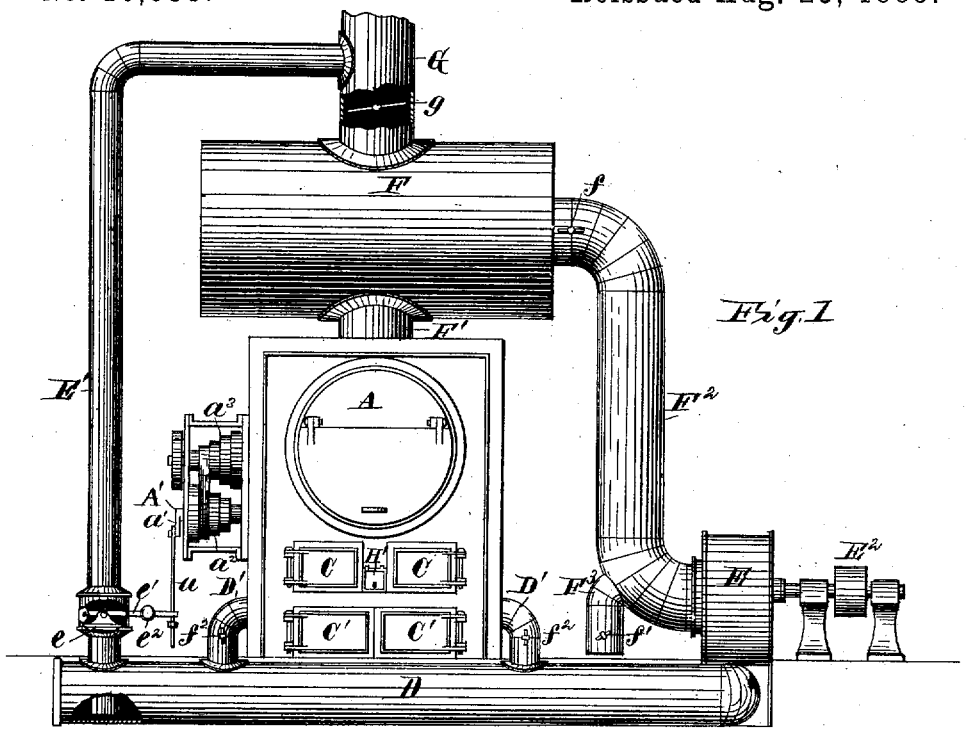
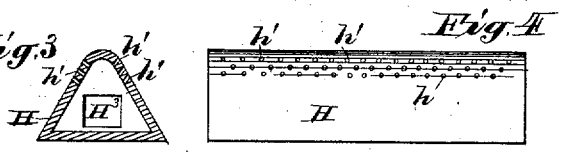
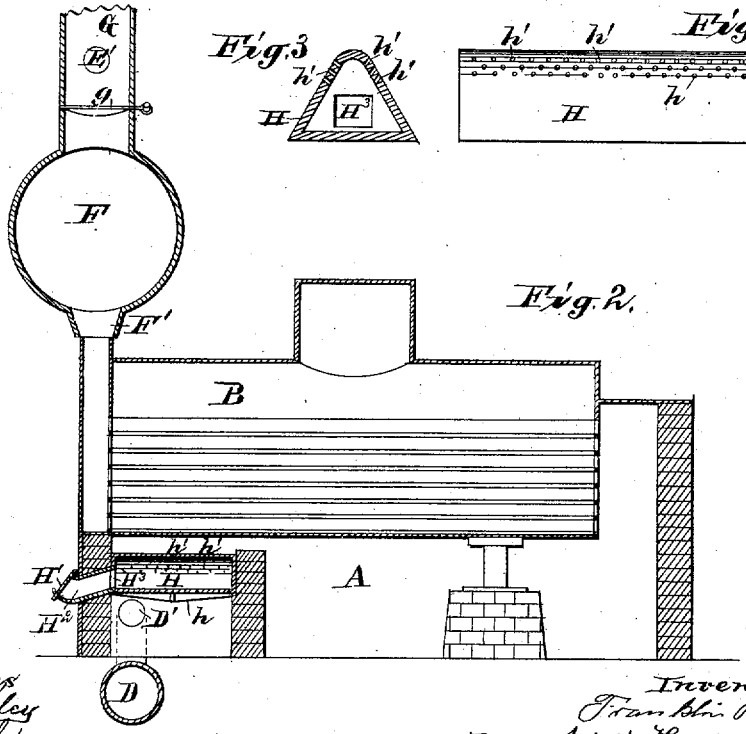
Witnesses
G. M. Gridley
H. H. Worth
Inventor
Franklin B. Giesler
By Adolf Herdegen
Attorney
THE NORRIS PETERS CO., WASHINGTON, D. C.

UNITED STATES PATENT OFFICE.

FRANKLIN B. GIESLER, OF MILWAUKEE, WISCONSIN, ASSIGNOR OF ONE-HALF TO ADOLPH LOGEMANN.

SMOKE-CONSUMING FURNACE.

SPECIFICATION forming part of Reissued Letters Patent No. 10,639, dated August 25, 1885.

Original No. 313,071, dated March 3, 1885. Application for reissue filed July 16, 1885.

*To all whom it may concern:*

Be it known that I, FRANKLIN B. GIESLER, of Milwaukee, in the county of Milwaukee and State of Wisconsin, have invented new and useful Improvements in Smoke-Consuming Furnaces; and I do hereby declare the following to be a full, clear, and exact description of said invention, reference being had to the accompanying drawings, and to the letters or figures of reference marked thereon, which form a part of this specification.

My invention relates to improvements in smoke-consuming furnaces; and it pertains to that class in which an exhaust-fan or other artificial draft is used to return the smoke and other products of combustion which would otherwise escape through the smoke-stack back to the combustion-chamber.

Heretofore it has been common to connect the return-pipe of an exhaust-fan with the combustion-chamber of the furnace, whereby all the products of combustion have been repeatedly and continuously passed around the circuit from the furnace to the exhaust-fan and from the exhaust-fan back to the furnace, thereby affording no means for the escape of the gradually-accumulating heavy non-combustible gases, which gases as they accumulate displace and prevent the admission of the required quantity of oxygen to maintain combustion.

The object of my present invention is to provide a device for carrying off the surplus accumulation of heavy or less combustible gas and other products of combustion thus accumulating, and permitting them to escape into the open air either through a smoke-stack or otherwise, and thereby providing for the admission of the required supply of oxygen to maintain combustion.

The apparatus for accomplishing this desired object is not necessarily limited to the precise form and arrangement of elements or devices shown. My invention is, however, explained by reference to the accompanying drawings, in which—

Figure 1 is a front elevation of a furnace embodying my invention. Fig. 2 is a vertical longitudinal section through the center of the furnace, and Figs. 3 and 4 are details.

A is the furnace, having the usual boiler, B. C C are doors that open in the combustion-chamber, and C′ C′ are doors that give access to the draft chamber beneath the grate, and from this draft-chamber one or more short flues, D′, lead into a horizontal flue, D, which latter is connected at one end with a blower, E, or other artificial draft, and at the other has an exhaust-pipe, E′, leading down into it. A flue, D, is preferably provided as a separation-chamber, into which all the products of combustion exhausted from the furnace are discharged, and in which the heavier or less combustible products of combustion are separated from the lighter. The precise form or location of the chamber or flue D is not material. It is, however, preferably made of considerable depth, so that the separation of the light and heavy gases may be more perfectly accomplished. As shown in Fig. 1, the exhaust-pipe E′, through which the gases escape, has its mouth preferably near the bottom of said flue or chamber, so that the heavier gas will escape through it, while the flues D′ D′, leading to the combustion-chamber, have their mouths preferably near its upper extremity, so as to conduct the lighter gas only therefrom. It is obvious that as the exhaust-pipe E′ is connected with the smoke-stack above a closed damper, it is impossible for the gas thus conducted away to be again returned to the furnace. It is immaterial, however, whether the pipe E′ is connected with the smoke stack or terminates directly in the open air.

F is a smoke-chamber, which is connected with the furnace by a flue, F′, and with the artificial draft or blower E by a pipe, $F^2$.

G is the smoke-stack, which is provided close to its point of connection with the smoke-chamber with the damper *g*, a slight distance above which the exhaust-pipe E′ enters the said smoke-stack. Another damper, *f*, is fitted in the pipe $F^2$ close to the smoke-chamber. Also connected with the exhaust side of said fan is a duct or passage, $F^3$, to admit fresh air through a regulating-valve, *f′*, and from thence to the combustion-chamber. The short flues D′ D′, which connect the horizontal flue D with the draft-chamber, are also provided with dampers $f^2$ $f^3$.

The exhaust-pipe E′ is preferably provided with a lift-valve, *e*, the stem *e′* of which carries an adjustable weight, $e^2$, and is projected far enough toward the furnace to come in the line of travel of a plate or rod, $a$, that is freely connected to the crank $a'$ of the shaft A', carrying the cone-pulley $a^2$, mounted with its companion pulley, $a^3$, in any suitable form of hanger on the corresponding side of the furnace. The cone-pulley $a^3$ is connected in any suitable manner with the driving mechanism.

In the center of the combustion-chamber I provide a flue, H, of any suitable form, but preferably of the shape shown in Figs. 3 and 4. This flue extends the whole length of the fire-bed, its closed bottom resting on top of the grate-bars $h$ $h$. In the upper part of this flue a series of perforations, $h'$ $h'$ $h'$ $h'$, are made on each side.

A passage, $H^2$, is formed in the front of the furnace, between the doors C C, to admit fresh air from the outside to said flue H through a corresponding opening, $H^3$, in the end wall of the flue, and this passage has a trap-door, H', which may be kept more or less open by means of any form of adjustable latch in use.

The blower E is belted in any suitable manner, as at pulley, $E^2$, with the driving mechanism.

The operation of my device is as follows: When the furnace-fire is first lighted, the damper $g$ in the smoke-stack G is opened and the smoke passes out in it until sufficient steam has been raised to operate the blower; but when this occurs the damper $g$ is closed, and the dampers $f$ of pipe $F^2$, as well as the dampers $f^2$ $f^2$ in the short flues D', being open, the blower will draw the smoke from the chamber F and force it through the flue D and its branches D' and into the combustion-chamber, together with a certain quantity of fresh air that is induced in the same time through the small flue $F^3$, the amount of air thus admitted being regulated by means of the valve $f'$. The valve $e$ in the lower end of the exhaust-pipe E' is lifted at intervals, determined by the position of the belt that connects the cone-pulleys $a^2$ and $a^3$, and this intermitting opening will permit the carbonic-acid gas and surplus smoke to pass out and away. This valve may, moreover, be set so as always to be partly open, so that there may be a constant draft that will carry off the carbonic-acid gas in flue D, while the smoke is forced through the fire box to form part of the fuel. As the fresh air admitted through the door H' and opening or passage $H^2$ into the flue H becomes sufficiently heated, it rushes up through the perforation in the upper portion of the said flue, and, besides producing a current that powerfully induces the return smoke through the fire-bed, it contributes its additional volume of oxygen to materially aid the combustion of of the gases.

If, as above stated, the damper $e$ is adjusted partially open, so that the heavier gas can escape, the damper-operating mechanism may under such circumstances be dispensed with.

I am aware that an exhaust-pipe located in a smoke-receiving chamber between the furnace and the inlet or exhaust side of the exhaust-fan has previously been made, as shown in Patent No. 16,317, of December 23, 1856, and I therefore make no claim to an exhaust so located, but, instead, only as located between the outlet or return side of the fan and the combustion-chamber, as shown and described in my specification.

Having thus described my invention, what I claim as new, and desire to secure by Letters Patent, is—

1. The combination, in a smoke-consuming furnace having an exhaust-fan or artificial draft, of an exhaust-pipe communicating from the furnace with the exhaust-side of said fan or artificial draft, and both a return and an escape pipe communicating from the return side of said fan or artificial draft, respectively, one with the furnace and the other with the exterior air, substantially as and for the purpose specified.

2. The combination, with a furnace, of pipes D, D', F', $F^2$, and $F^3$, the reservoir and blower-pipe E', and its valve, and mechanism for lifting the latter at intervals, substantially as described.

3. In a smoke-consumer, the combination, with the furnace A, the horizontal flue D, and its branches D' D', of a chamber or flue formed above the grate-bars in the center and the whole length of the furnace, and having its closed bottom resting on the grate-bars, suitable perforations on each side, near its top, and an adjustable door opening in the furnace-front, substantially as and for the purpose set forth.

In testimony whereof I affix my signature in presence of two witnesses.

FRANKLIN B. GIESLER.

Witnesses:

ADOLF HERDEGEN,

HARRY M. WORK.